US006527950B2

(12) United States Patent
Conrad et al.

(10) Patent No.: US 6,527,950 B2
(45) Date of Patent: *Mar. 4, 2003

(54) CONSTRUCTION OF A WATER TREATMENT APPLIANCE

(75) Inventors: Wayne Conrad, Hampton (CA); Terry Bohrson, Orono (CA); John Stouth, Walnfleet (CA); Mike Badgley, Ajax (CA); Joe Garrison, Niagara Falls (CA); Shawn Nielsen, Grimsby (CA); Richard Zulik, Beamsville (CA); Deryk Lisicky, Port Colborne (CA)

(73) Assignee: Chiaphua Industries Limited, Tai Po (HK)

( * ) Notice: Subject to any disclaimer, the term of this patent is extended or adjusted under 35 U.S.C. 154(b) by 0 days.

This patent is subject to a terminal disclaimer.

(21) Appl. No.: 09/758,246

(22) Filed: Jan. 12, 2001

(65) Prior Publication Data

US 2001/0027940 A1 Oct. 11, 2001

Related U.S. Application Data

(63) Continuation-in-part of application No. 09/417,836, filed on Oct. 14, 1999, now Pat. No. 6,361,686.

(51) Int. Cl.⁷ .............................................. B01D 19/00
(52) U.S. Cl. .................. 210/188; 210/192; 210/248; 422/186.07; 96/202; 96/219
(58) Field of Search .................. 210/188, 192, 210/232, 248, 436, 472, 748, 760, 120, 121, 123; 422/24, 28, 186.07; 96/155, 202, 203, 219

(56) References Cited

U.S. PATENT DOCUMENTS

| 2,432,887 | A | * | 12/1947 | Haviland |
| 3,692,180 | A | | 9/1972 | LaRaus ...................... 210/139 |
| 4,298,467 | A | | 11/1981 | Gartner et al. ............. 210/96.1 |
| 4,412,924 | A | | 11/1983 | Feather ........................ 210/744 |
| 4,599,166 | A | | 7/1986 | Gesslauer ................... 210/96.1 |
| 4,599,170 | A | | 7/1986 | Friedman et al. ........... 210/223 |
| 4,652,370 | A | | 3/1987 | Bachhofer et al. .......... 210/192 |

(List continued on next page.)

FOREIGN PATENT DOCUMENTS

| CA | 1223231 | 6/1987 |
| CA | 1252071 | 4/1989 |
| CA | 2089414 | 8/1994 |
| CA | 2180185 | 12/1996 |
| CA | 2171515 | 9/1997 |
| CA | 2113388 | 12/1997 |
| CA | 2206149 | 11/1998 |
| CA | 2093006 | 12/1998 |
| GB | 2257429 A | 11/1991 |
| JP | 1299694 | 12/1989 ................ 210/241 |

Primary Examiner—Joseph W. Drodge
(74) Attorney, Agent, or Firm—Philip C. Mendes da Cost; Bereskin & Parr

(57) ABSTRACT

A water treatment apparatus for treating ozone with water is disclosed. A treatment carafe has a gas conduit so that off gases which accumulates in the carafe may be vented during a treatment cycle. The gas conduit conveys the off gas from the carafe to an ozone destructor via a passageway. An accumulator is provided in the passageway upstream from the destructor to hinder water entrained in the off gas from contacting and damaging the destructor.

25 Claims, 6 Drawing Sheets

U.S. PATENT DOCUMENTS

| | | | | |
|---|---|---|---|---|
| 4,654,142 A | | 3/1987 | Thomsen et al. | 210/232 |
| 4,959,142 A | | 9/1990 | Dempo | 210/167 |
| 5,075,016 A | | 12/1991 | Barnes | 210/760 |
| 5,106,495 A | | 4/1992 | Hughes | 210/139 |
| 5,174,905 A | * | 12/1992 | Shaw | 210/760 |
| 5,207,993 A | | 5/1993 | Burris | 422/256 |
| 5,213,773 A | * | 5/1993 | Burris | 210/188 |
| 5,308,482 A | | 5/1994 | Mead | 210/207 |
| 5,582,717 A | | 12/1996 | Di Santo | 210/86 |
| 5,607,582 A | | 3/1997 | Yamazaki et al. | 210/234 |
| 5,670,094 A | | 9/1997 | Sasaki et al. | 261/27 |
| 5,683,576 A | | 11/1997 | Olsen | 210/138 |
| 5,709,799 A | | 1/1998 | Engelhard | 210/748 |
| 5,711,887 A | | 1/1998 | Gastman et al. | 210/748 |
| 5,741,416 A | | 4/1998 | Tempest, Jr. | 210/90 |
| 5,765,403 A | | 6/1998 | Lincoln et al. | 68/13 R |
| 5,766,488 A | | 6/1998 | Uban et al. | 210/739 |
| 5,785,866 A | | 7/1998 | Gehringer et al. | 210/748 |
| 5,900,143 A | | 5/1999 | Dalton et al. | 210/192 |
| 5,968,352 A | * | 10/1999 | Ditzler | |
| 6,013,189 A | | 1/2000 | Burris | 210/750 |
| 6,103,114 A | | 8/2000 | Tanner et al. | 210/232 |
| 6,267,895 B1 | * | 7/2001 | Englehard et al. | 210/748 |
| 6,312,588 B1 | * | 11/2001 | Conrad | 210/192 |
| 6,361,686 B1 | * | 3/2002 | Conrad | 210/192 |
| 6,391,191 B2 | * | 5/2002 | Conrad | 210/192 |

\* cited by examiner

CONSTRUCTION OF A WATER TREATMENT APPLIANCE

This application is a continuation in part of U.S. application Ser. No. 09/417,836 filed on Oct. 14, 1999 now U.S. Pat. No. 6,361,686.

FIELD OF THE INVENTION

This invention relates to water treatment apparatus, which uses a gas, preferably ozone, as a water treatment agent. In a preferred embodiment, the invention relates to a water treatment carafe for a domestic counter top water treatment appliance.

BACKGROUND OF THE INVENTION

Water treatment apparatus using oxidizing gases have been developed. Some of these devices operate on a batch basis. According to this process, the water is placed in a treatment container and the treatment agent (e.g. a gas), is disbursed through the water, such as via a sparger. Following the completion of the cycle, the water may then be used.

Ozone is an effective oxidizing agent. However, if the device releases excessive quantities of ozone, headaches and the like can occur. However, the treatment vessel is preferably airtight so that the ozone which is not consumed in the treatment cycle is collected and preferably converted to a benign gas (e.g. oxygen).

SUMMARY OF THE INVENTION

In accordance with the instant invention, there is provided a water treatment apparatus comprising a base; a water treatment reservoir removable from the base, the water treatment reservoir in fluid communication with an ozone source when mounted on the base, the reservoir having a bottom and an off gas venting outlet; a fluid passageway extending between the off gas venting outlet of the water treatment reservoir and an ozone destructor when the water treatment reservoir is mounted on the base; and, a gas water separator positioned in the fluid passageway between the water treatment reservoir and the ozone destructor, the gas water separator positioned such that water accumulated in the gas water separator during a water treatment cycle automatically drains from the apparatus when the water treatment reservoir is removed from the base.

In one embodiment, the gas water separator is at an elevated position with respect to the bottom of the water treatment reservoir when the water treatment reservoir is positioned on the base.

In another embodiment, the off gas venting outlet is positioned in the bottom of the water treatment reservoir.

In another embodiment, the gas water separator has a wider cross sectional area than the fluid passageway whereby the off gas decelerates as it enters the gas water separator.

In another embodiment, the destructor is a metal oxide.

In another embodiment, the destructor is positioned above the gas water separator.

In another embodiment, the water treatment reservoir is configured to define a head space in which off gas accumulates after the ozone passes through water in the reservoir and the apparatus further comprises a conduit in communication with the head space whereby off gas is conveyed from the head space during the treatment of water in the reservoir.

In another embodiment, the apparatus further comprises a hollow member which extends from the head space and contacts the off gas venting outlet when the reservoir is placed on the base.

In another embodiment, the water treatment reservoir has a water inlet and the apparatus further comprises a sealing member movably mounted between a first position in which the water inlet is sealed and a second position in which the water inlet is open and a driving member for moving the sealing member between the first and second positions.

In another embodiment, the driving member is actuated when the water treatment reservoir is placed on the base and removed from the base.

In accordance with the instant invention, there is also provided a water treatment apparatus comprising a base; a water treatment reservoir removable from the base, the water treatment reservoir in fluid communication with an ozone source when mounted on the base, the reservoir having a bottom and an off gas venting outlet; a fluid passageway having a first end engagable with the off gas venting outlet of the water treatment reservoir when the water treatment reservoir is mounted on the base and a second end for venting the off gas to the ambient; an ozone destructor positioned in the fluid passageway; and, a gas water separator positioned in the fluid passageway between the water treatment reservoir and the ozone destructor and positioned at an elevated position with respect to the base, the first and second ends of the fluid flow passage being open to the ambient when the water treatment reservoir is removed from the base.

In accordance with the instant invention, there is also provided an apparatus for treating water with an oxidizing gas in a water treatment reservoir comprising a water treatment reservoir; destructor means for converting the oxidizing gas to a benign gas; passageway means for conveying off gas from the water treatment reservoir to the destructor means; separation means positioned in the passageway means for separating water from the off gas as the off gas travels from the water treatment reservoir to the destructor means; and, drainage means for removing the water separated from the off gas by the separation means from the apparatus by gravity flow.

In one embodiment, the water treatment reservoir is removable mounted on a base and the drainage means operates automatically when the water treatment reservoir is removed from the base.

In another embodiment, the apparatus further comprises water inlet means associated with the water treatment reservoir, movably mounted sealing means for sealing the water inlet means when the sealing member is in a closed position and actuating means drivingly connected to the sealing means and having a portion provided on the exterior of the carafe to move the sealing means to the closed position.

In another embodiment, the apparatus further comprises chamber means for accumulating off gas after the oxidizing gas passes through water in the reservoir and conduit means in communication with the chamber means and having an outlet from the water treatment reservoir whereby off gas is conveyed from the chamber means during the treatment of water in the reservoir.

In another embodiment, the separation means is positioned above the outlet.

BRIEF DESCRIPTION OF THE DRAWINGS

These and other advantages of the instant application will be more fully and clearly understood in connection with the following description of a preferred embodiment of the invention in which.

DESCRIPTION OF THE PREFERRED EMBODIMENT

Figure 1:
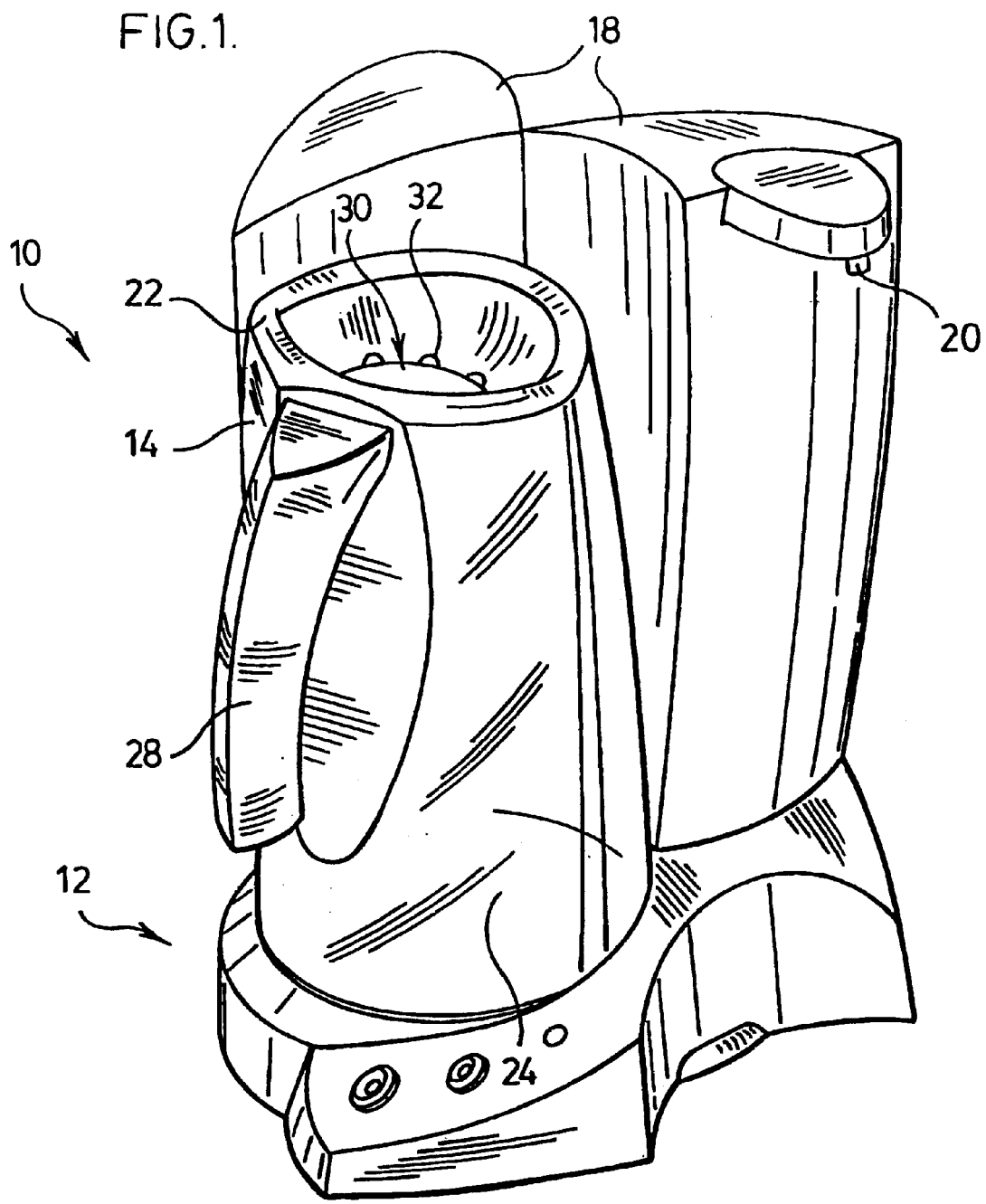
FIG. 1 is a perspective view of an apparatus according to the instant invention.
Figure 2:
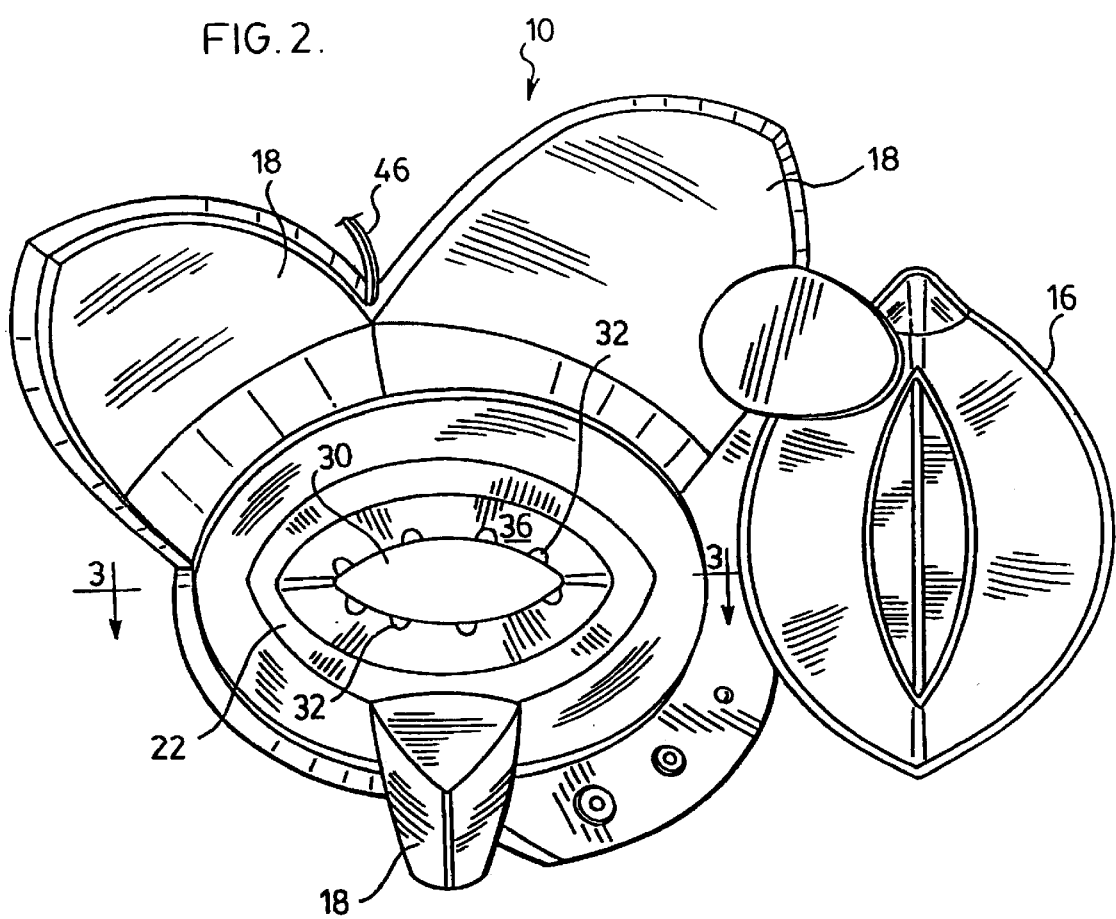
FIG. 2 is a top plan view of FIG. 1 with a treated water carafe shown in position for receiving water dispensed from the apparatus of FIG. 1.

Referring to FIGS. 1 and 2, the water treatment apparatus is generally designated by reference numeral 10. The apparatus comprises a base 12, removable treatment carafe 14 and housing 18. Housing 18 may be of any particular design and may contain any required sensing equipment, water filters, pumps and the like. Housing 18 is preferably connectable in flow communication with treatment carafe 14 such that treated water may be dispensed from dispenser 20 after the completion of the treatment cycle of the water in treatment carafe 14. As shown in FIG. 2, a treated water carafe 16 may be positioned underneath dispenser 20 for receiving the treated water.

The shape and configuration of treatment carafe 14 and treated water carafe 16 may be of any particular design which is aesthetically pleasing. As shown in particular in FIGS. 3 and 5, treatment carafe 14 has a top 22, side walls 24 and a bottom 26. Optionally, as shown in FIGS. 1 and 2, a handle 28 may be provided to allow the user to manipulate carafe 14.

Carafe 14 is designed to be filled with a liquid which is to be treated. In particular, it is preferred that the liquid is water. Carafe 14 is removably mounted to base 12. Accordingly, when the user wishes to treat water, the user may be move carafe 14, e.g. by means of handle 28. The top 22 of carafe 14 may be placed underneath a source of water (e.g. a kitchen tap) and the tap may be turned on to allow the carafe to be filled. Once filled, carafe 14 may then be placed on base 12.

Figure 5:
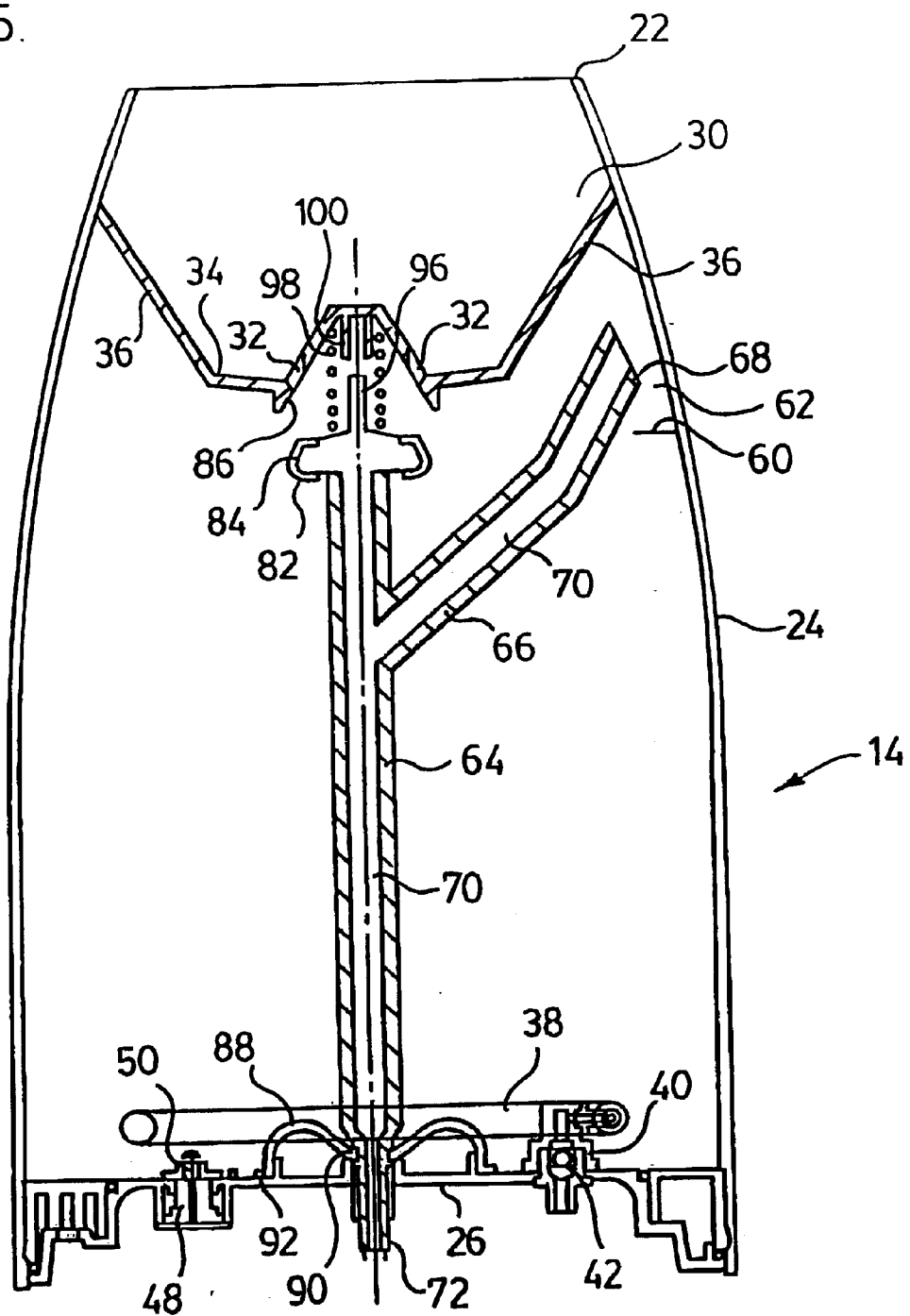
FIG. 5 is a cross-section along the line 3—3 of FIG. 2 of the treatment carafe when removed from the base portion of the apparatus; and, FIG. 6 is a perspective view of an alternate embodiment for a venting tube for a treatment carafe according to the instant invention.

In one preferred embodiment of this invention, in order to simplify the filling operation, top 22 is provided with a recess 30. The upper portion of carafe 14 is provided with at least one, but preferably a plurality of water inlet ports 32 in recess 30. Recess 30 may be of any particular configuration which provides an open area in which the water to be treated may be poured so that it may drain into carafe 14 through water inlet ports 32. Accordingly, as shown in FIG. 5, recess 30 may be funnel shaped. For example, the upper portion of cavity 14 has an upper surface 34. A portion of upper surface 34 may comprise sloped portion 36 which extends downwardly towards the centre of carafe 30. By designing carafe 14 with a recess 30 containing water inlet ports 32, the user need not remove a lid from carafe 14 so as to fill it. It will be appreciated that the automatic sealing mechanism and the automatic gas conduit connection feature of this invention may be designed to work regardless of the shape of the top of carafe 14. For example, the top of carafe 14 may be flat and that inlet ports 32 may be provided in the flat top (not shown). The creation of a recess provides a funnel to reduce or prevent spillage during the filling operation.

The water in treatment carafe 14 is treated with an oxidizing gas. The oxidizing gas is preferably ozone. However, other oxidizing gases such as hydrogen peroxide are known. The remaining description is based upon a preferred embodiment in which the oxidizing gas is ozone.

When the treatment cycle is commenced, ozone is introduced into carafe 14. In the preferred embodiment, carafe 14 is provided with an annular sparger 38 which has a plurality of openings in the surface thereof. Sparger 38 is connected to a supply port 40. Supply port 40 has an associated valve 42. Base 12 is provided with a supply conduit 44 which is seated immediately below valve 42. Supply conduit 44 is in air flow communication with a source of ozone. For example, an air pump may be positioned upstream of supply conduit 44 so as to feed air to an ozone generator which in turn provides a feed supply of ozone to supply conduit 44. The air pump and the ozone generator may be provided in one of the housings 18. Electricity to run the electronics of the unit, including the air pump and the ozone generator, may be supplied by means of electric cord 46 (see FIG. 2).

Valve 42 is movable between an open position and a closed position. When valve 42 is in the closed position, sparger 38 is sealed. Accordingly, as water is introduced into carafe 14, water will not drain through supply port 40. When valve 42 is in the open position, ozone may be supplied via conduit 44, through port 40 into sparger 38. Valve 42 may be moved from the closed position to the open position by means of the force of ozone containing air passing through conduit 44. It is to be appreciated that valve 42 may be biased to the closed position by gravity, a spring or the like.

Treated water may be decanted from carafe 14 by any means known in the art. Accordingly, carafe 14 could be removed from base 12 and the water decanted such as by means of a spout or the like. Preferably, the treated water is decanted from carafe 14 while carafe 14 is positioned on base 12. To this end, a water exit port 48 may be provided in bottom 26 (see FIG. 3). A valve 50 is provided in water exit port 48. At the end of a cycle, valve 50 may be actuated, for example, by the means of solenoid 52. When solenoid 52 is actuated, linkage 54 moves engagement member 56 upwardly. This movement displaces engagement member 56 upwardly so as to move displacer rod 58 upwardly. The upward movement of displacer rod 58 moves valve 50 to the open position allowing the treated water to exit through water exit port 48. Water exit port 48 may be in flow communication with a water pump so as to pump the treated water through a filter (e.g. a carbon block filter) which may be located in housing 18 and from there through dispenser 20 to, e.g. a glass or treated water carafe 16.

Figure 3:
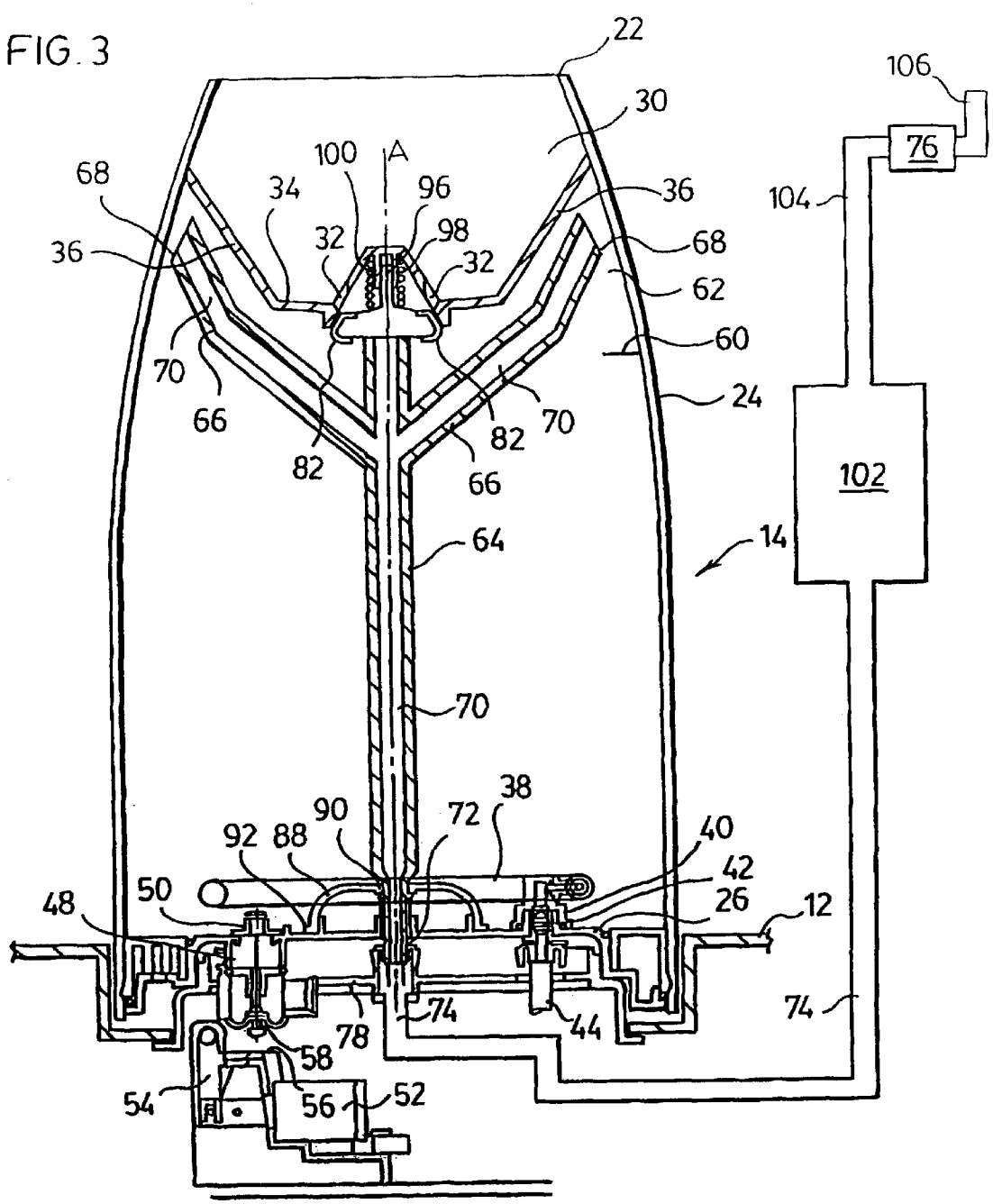
FIG. 3 is a cross-section along the line 3—3 in FIG. 2.

Carafe 14 may be provided with a fill line 60 so as to indicate to the user the portion of carafe 14 which should be filled with water to be treated. Fill line 60 may be provided at any location in carafe 14 provided a chamber or the like which acts as an off gas receiving means is provided above fill line 60 for receiving off gases. The top of carafe 14 may be flat if the carafe is not filled to the top. Alternately, the top of carafe 14 may be angled so as to direct the off gas to a particular location, head gas space 62. In the embodiment of FIGS. 3 and 5, the top of carafe 14 has an angled top to create an annular head gas space 62 in which the off gas may accumulate. During the treatment of water in carafe 14, ozone is bubbled through the water by means of sparger 38. The off gases accumulate above the water (e.g. above fill line 60) in head gas space 62.

Ozone may cause side effects in people exposed to sufficient quantities of these gases (e.g. headaches). Accordingly, the off gases are preferably collected and treated (e.g. by exposing them to a destructor which will convert the gas to a more benign form). For example, in the case of ozone, the destructor may be a catalyst for converting ozone to oxygen such as one or more of manganese dioxide, titanium dioxide, iron oxide and carbon. Contact between ozone and one or more of these catalysts will case the ozone to convert to oxygen which may then be released harmlessly from the system. Accordingly, in one preferred embodiment, carafe 14 includes a gas conduit having a first end in fluid flow communication with head gas space 62 and a second end which is connected in fluid flow communication with an off gas treatment member (e.g. a destructor) when carafe 14 is placed on base 12 and apparatus 10 is actuated to treat water in carafe 14.

Figure 6:
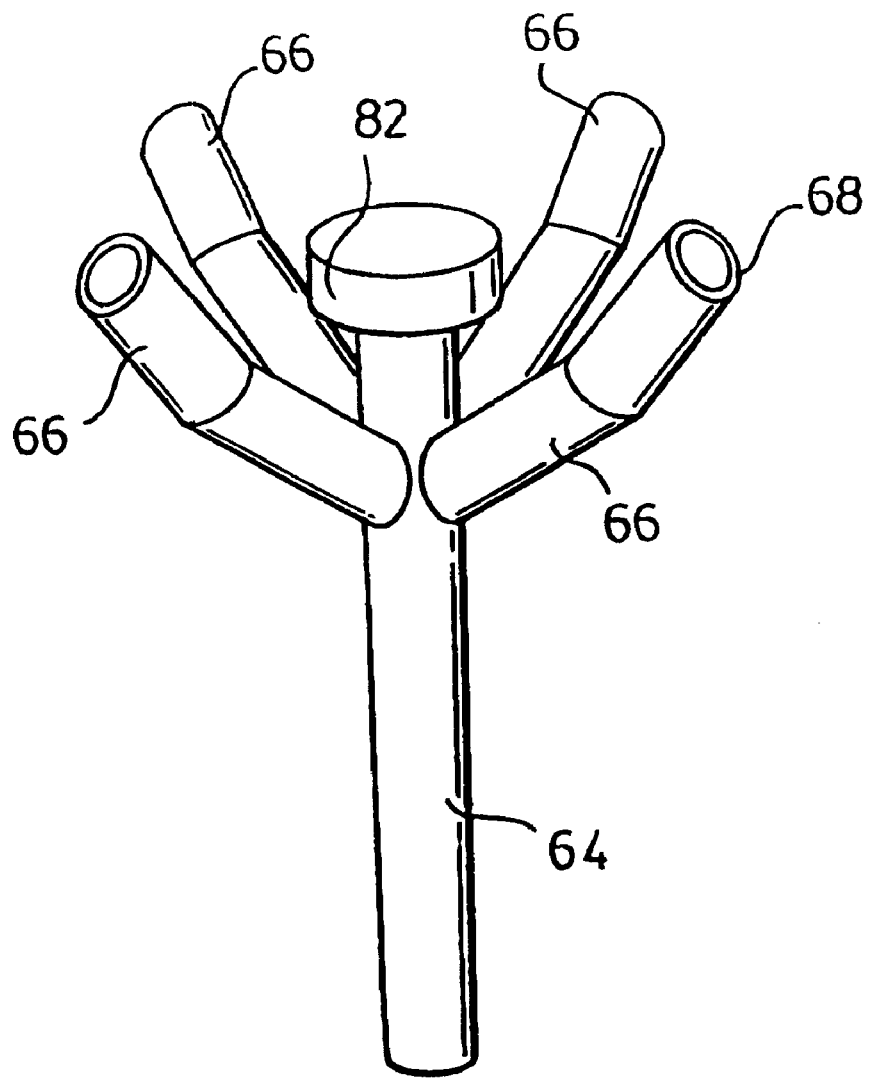

Referring to FIG. 3, carafe 14 is provided with a support rod 64 having two arms 66. Each arm 66 has an upper end 68 positioned in head gas space 62 when apparatus 10 is operational. Support rod 64 and arms 66 are hollow so as to define a passage 70 extending from head gas space 62 through bottom 26 of carafe 14. Support rod 64 is provided with an end portion 72 which is connectable in air flow communication with off gas conduit 74. In the embodiment of FIG. 5, support rod 64 is provided with a single arm 66. In the embodiment of FIG. 6, Support rod has 4 arms 66. Despite carafe including fill line 60, a user may still over fill carafe 14. This may occur by the user placing carafe 14 at an angle under a tap (e.g. axis A is at an angle to the vertical). By providing arms 66, the excess water above fill line 60 will flow down arm 66, through rod 64 into the sink. Preferably, a plurality of arms 66 are provided so as to ensure that excess water will flow through rod 64 regardless of the angle of axis A.

Off gas conduit 74 is in air flow communication with off gas treatment member 76. Off gas treatment member 76 may be a destructor for catalytically converting the ozone to a benign gas (e.g. oxygen). Examples of such destructor material are known in the are, such as Caruilite™ and may comprise oxides of manganese, iron titanium, and tin. Such destructor materials degrade or lose mechanical integrity upon exposure to water. Therefore, off gas treatment member is positioned downstream from passage so as not to be damaged by water if water enters passage 70 (e.g. carafe 14 is overfilled such that water flows down passage 70. Preferably, off gas treatment member 76 is positioned above arms 66 and more preferably above ends 68 of arms 66.

As some water may enter passage 70 due to the bubbling effect caused by the ozonation process, an accumulator 102 is preferably positioned upstream from off gas treatment member 76. Accumulator 102 may be any gas/liquid separator known in the art. Preferably, accumulator is a hollow chamber having an increased diameter compared to passage 74 so that the off gas decelerates as it enters accumulator 102 and allows water entrained in the off gas flow to settle out from the off gas. The off gas then exits accumulator 102 via passage 104 and passes through off gas treatment member 76 were the ozone is converted to oxygen. The treated off gas then exits the apparatus via passage 106. After a treatment cycle, water may have accumulated in accumulator 102. The water may be stored in accumulator 102. When carafe 14 is removed from the apparatus for refilling, end 72 of rod 64 is removed from passage 74. When this occurs, water in accumulator 102 may from downwardly to the beginning of passage 74 due to gravity and accumulate of upper surface 78 where it may be removed by a user. Alternately, the water may flow to a drainage channel provided in surface 78. Thus passage 74 functions as a drainage means for draining accumulator 102. It will be appreciated that a separate passage may be utilized to drain water from accumulator 102 to a convenient outlet located on the apparatus. Preferably, water drains from accumulator 102 solely by gravity flow. Preferably, the drainage occurs automatically when carafe 14 is removed from the base. In this way, water will not accumulate in passage 74 during several treatment cycles and build up to the extent that off gas treatment member 76 is damaged.

Preferably, upper end 68 is positioned above water inlet ports 32 so that, when the unit is filled, water will not enter into passage 70. It will also be appreciated that by placing upper end 68 to one side of carafe 14 (e.g. spaced from water inlet ports 32) that water will tend not to enter passage 70 as carafe 14 is filled. It will also be appreciated that upper end 68 may be configured so as to inhibit the entry of water regardless of the position of upper end 68 with respect to water inlet ports 32. Upper end 68 should be far enough above the water line so that the increase in water volume when air is bubbled through it does not cause water to drain into passage 70. As upper end 68 is positioned and/or configured so as not to allow water to enter passage 70 there through, end portion 72 need not include a valve member to seal passage 70. Accordingly, as shown in FIG. 5, end portion 72 may be opened when carafe 14 is removed from base 12.

Figure 4:
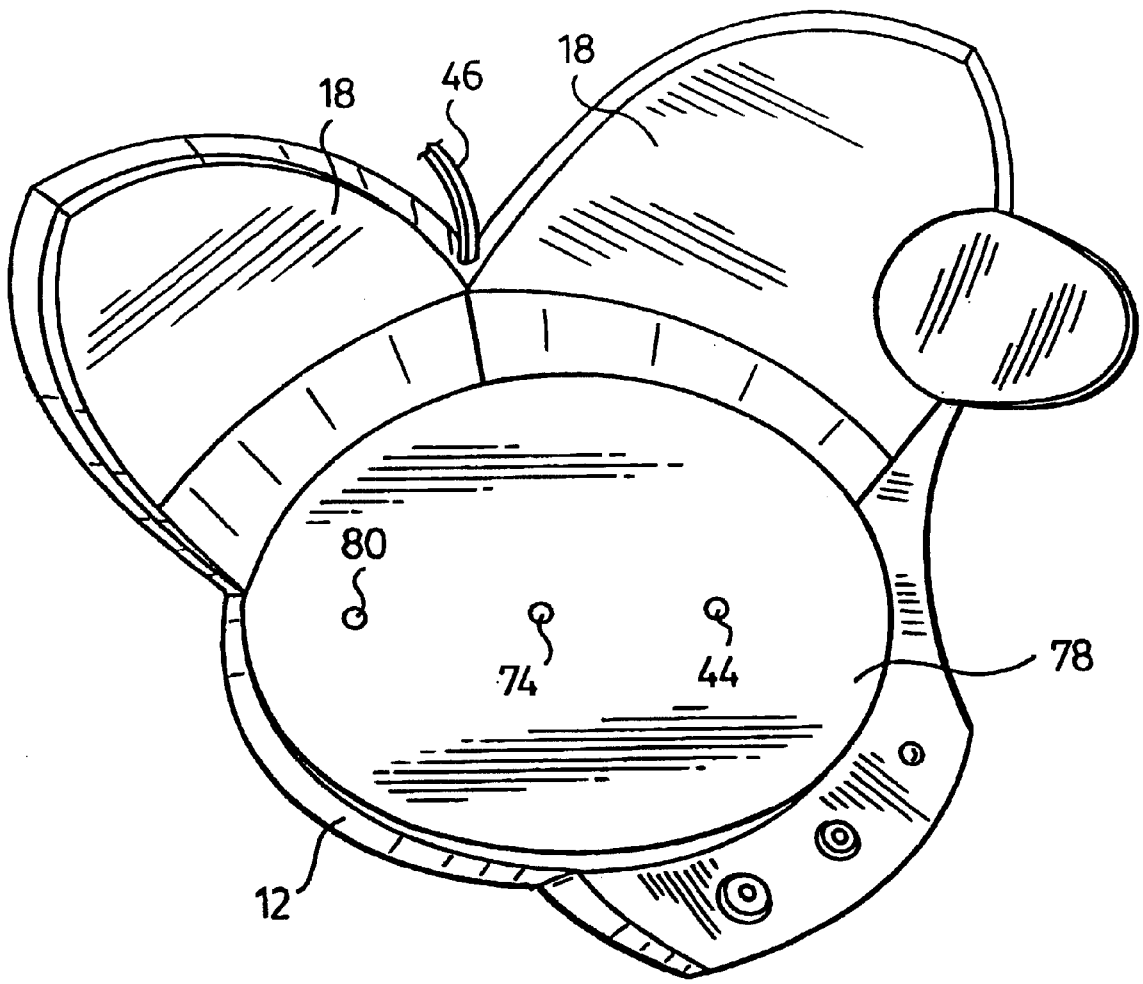
FIG. 4 is a top plan view of the apparatus shown in FIG. 4 with the treatment carafe removed therefrom.

Referring to FIG. 4, base 12 is shown having a generally horizontal upper surface 78. Upper surface 78 is configured so as to allow bottom 26 to be seated thereon. The seating of bottom 26 on upper surface 78 is shown in detail in FIG. 3. As shown in FIG. 4, three openings are provided in upper surface 78. The first is the upper end of supply conduit 44 which is engaged with supply port 40 when carafe 14 is placed on base 12. The second is the top of water outlet conduit 80 which receives treated water when valve 50 is opened. The third is the upper end of off gas conduit 74. End portion 72 engages the upper end of off gas conduit 74 when carafe 14 is placed on base 12.

Accordingly, it will be understood that one advantage of the instant invention is that head gas space 62 is automatically in communication with off gas conduit 74 by placing carafe 14 on base 12. The user need not make any connections between the carafe and an off gas treatment conduit. Accordingly, ozone will not be accidentally released during the operation of the unit if the consumer forgets to make a connection. Further, if an off gas sensor is used to control the duration of the treatment cycle, all of the off gas will be available for passage through a sensor via conduit 74.

In accordance with another embodiment of this invention, sealing member 82 is provided for closing water inlet ports. Sealing member 82 is movable between a first position in which water inlet 32 is sealed (see FIG. 3) and a second position in which the water inlet ports 32 are open (see FIG. 5). Referring to FIG. 3, when carafe 14 is placed on base 12 and is ready for a treatment cycle to begin, sealing member 82 is in the closed position. In this position, engagement surface 84 of sealing member 82 contacts engagement surface 86 of carafe 14 thereby creating a seal between water inlet 32 and the interior of carafe 14. As shown in FIG. 5, when carafe 14 is removed from the unit and is ready to be filled, sealing member 82 is displaced from engagement surface 86 thereby allowing water to enter through water inlet 32 into carafe 14.

A linkage, which is connected to sealing member 82, is provided for moving sealing member 82 between the second and first positions in response to the placement of carafe 14 on base 12. Thus, when carafe 14 is placed on base 12, carafe 14 is automatically sealed and ready for the commencement of a treatment cycle. In a preferred embodiment, sealing member 82 is provided at the upper end of support rod 64 which acts as the driving member. The engagement of end portion 72 into the upper end of off gas conduit 74 drives sealing member 82 (which may be a resilient member which is resistant to ozone) into engagement with engagement surface 86. Thus, end portion 72 comprises an actuating means drivingly connected to sealing member 82 and operably responsive to placement of carafe 14 on base 12. It will be appreciated that other means may be provided for moving the sealing means. For example, handle 28 may have a trigger to open sealing member 82 when the user picks up carafe 14. Thus the user may automatically open water inlet 32 when they pick up the carafe and seal water inlet 32 when they release handle 28.

In the preferred embodiment shown in FIGS. 3 and 5, support rod 64 (with end portion 72) operates both as the actuating means as well as the gas conduit means for connecting head gas space 62 with off gas conduit 74. It will be appreciated that different apparatus may be included in carafe 14 for performing each of these different functions. It will further be appreciated that only one of these two apparatus (i.e. one of the actuating means and the gas conduit means) may be provided in a carafe 14.

In order to prevent water from leaking from carafe 14 into off gas conduit 74, a sealing member may be provided. The sealing member may comprise a water tight bushing provided in bottom 26 surrounding end portion 72. Alternately, as shown in FIGS. 3 and 5, a diaphragm 88 may be provided. Diaphragm 88 is a deformable member (preferably a resilient member) which may be made from any ozone resistant material. The upper portion of diaphragm 88 has an opening defining an upper perimeter 90 which surrounds the upper end of end portion 72 and forms a water tight seal therewith. The lower portion of diaphragm 88 is provided with a lower perimeter 92 which is connected to the interior of bottom 26 so as to form a water tight seal with bottom 26. As support rod 64 moves downwardly to the open position (see FIG. 5) and then back upwardly to the sealed position (see FIG. 3) diaphragm 88 flexes downwardly and upwardly to maintain a water tight seal.

Support rod 64 may be designed so as to automatically move to the open position as shown in FIG. 5 due the force of gravity when carafe 14 is removed from base 12. Alternately, a biasing member (e.g. a spring or other resiliently deformable member) may be provided to bias support rod 64 to the open position. The biasing member may be provided so as to interact with any portion of support rod 64 (either upper end 96 or end portion 72). For example, a spring 98 may be provided around support arm 100 and upper end 96. Spring 98 exerts a downward pressure on support rod 64 at all times. Accordingly, when carafe 14 is removed from base 12, spring 98 will cause support rod 64 to move to the downward position. The weight of carafe 14 is sufficient, particularly when filled with water, to cause support rod 64 to move upwardly thereby compressing spring 98. Alternately, it will be appreciated that diaphragm 88 may be configured to bias support rod 64 to the open position.

It will be appreciated by those skilled in the art that various additions and modifications may be made to the instant invention and all of these are within scope of the following claims.

We claim:

1. A water treatment apparatus comprising:
   (a) a base;
   (b) a water treatment reservoir removable from the base, the water treatment reservoir in fluid communication with an ozone source when mounted on the base, the reservoir having a bottom and an off gas venting outlet positioned in the bottom of the water treatment reservoir;
   (c) a fluid passageway extending between the off gas venting outlet of the water treatment reservoir and an ozone destructor when the water treatment reservoir is mounted on the base; and,
   (d) a gas water separator positioned in the fluid passageway between the water treatment reservoir and the ozone destructor, the gas water separator positioned such that water accumulated in the gas water separator during a water treatment cycle automatically drains from the apparatus when the water treatment reservoir is removed from the base.

2. The apparatus as claimed in claim 1 wherein the gas water separator is at an elevated position with respect to the bottom of the water treatment reservoir when the water treatment reservoir is positioned on the base.

3. The apparatus as claimed in claim 1 wherein the gas water separator has a wider cross sectional area than the fluid passageway whereby the off gas decelerates as it enters the gas water separator.

4. The apparatus as claimed in claim 1 wherein the destructor is comprised of a metal oxide.

5. The apparatus as claimed in claim 1 wherein the destructor is positioned above the gas water separator.

6. The apparatus as claimed in claim 1 wherein the water treatment reservoir is configured to define a head space in which off gas accumulates after the ozone passes through water in the reservoir and the apparatus further comprises a conduit in communication with the head space and the off gas venting outlet whereby off gas is conveyed from the head space during the treatment of water in the reservoir.

7. In The apparatus as claimed in claim 1 wherein the water treatment reservoir has a water inlet and the apparatus further comprises a sealing member movably mounted between a first position in which the water inlet is sealed and a second position in which the water inlet is open and a driving member for moving the sealing member between the first and second positions.

8. The apparatus as claimed in claim 7 wherein the driving member is actuated when the water treatment reservoir is placed on the base and removed from the base.

9. A water treatment apparatus comprising:
   (a) a base;
   (b) a water treatment reservoir removable from the base, the water treatment reservoir in fluid communication with an ozone source when mounted on the base, the reservoir having a bottom, an off gas venting outlet and a conduit that extends downwardly through the water treatment reservoir to the off gas venting outlet;
   (c) a fluid passageway having a first end engagable with the off gas venting outlet of the water treatment reservoir when the water treatment reservoir is mounted on the base and a second end for venting the off gas to the ambient;
   (d) an ozone destructor positioned in the fluid passageway; and,
   (e) a gas water separator positioned in the fluid passageway between the water treatment reservoir and the ozone destructor and positioned at an elevated position with respect to the base, the first and second ends of the fluid flow passage being open to the ambient when the water treatment reservoir is removed from the base.

10. The apparatus as claimed in claim 8 wherein the gas water separator has a wider cross sectional area than the fluid passageway whereby the off gas decelerates as it enters the gas water separator.

11. The apparatus as claimed in claim 9 wherein the destructor is comprised of a metal oxide.

12. The apparatus as claimed in claim 9 wherein the water treatment reservoir is configured to define a head space in which off gas accumulates after the ozone passes through water in the reservoir and the conduit extends from the head space to the off gas venting outlet whereby off gas is conveyed from the head space during the treatment of water in the reservoir.

13. The water treatment apparatus as claimed in claim 9 wherein the off gas venting outlet is positioned in the bottom of the water treatment reservoir.

14. An apparatus for treating water with an oxidizing gas in a water treatment reservoir comprising:
   (a) a water treatment reservoir and water inlet means associated with the water treatment reservoir;
   (b) destructor means for converting the oxidizing gas to a benign gas;
   (c) passageway means for conveying off gas from the water treatment reservoir to the destructor means;
   (d) separation means positioned in the passageway means for separating water from the off gas as the off gas travels from the water treatment reservoir to the destructor means; and,
   (e) drainage means for removing the water separated from the off gas by the separation means from the apparatus by gravity flow; and,
   (f) movably mounted sealing means for sealing the water inlet means when the sealing member is in a closed position and actuating means drivingly connected to the sealing means and having a portion provided to the exterior of the reservoir to move the sealing means to the closed position.

15. The apparatus as claimed in claim 14 wherein the water treatment reservoir is removable mounted on a base and the drainage means operates automatically when the water treatment reservoir is removed from the base.

16. The apparatus as claimed in claim 14 further comprising chamber means for accumulating off gas after the oxidizing gas passes through water in the reservoir and conduit means in communication with the chamber means and having an outlet from the water treatment reservoir whereby off gas is conveyed from the chamber means during the treatment of water in the reservoir.

17. The apparatus as claimed in claim 16 wherein the separation means is positioned above the outlet.

18. A water treatment apparatus comprising:
   (a) a base;
   (b) a water treatment reservoir removable from the base, the water treatment reservoir in fluid communication with an ozone source when mounted on the base, the reservoir having a bottom, a water inlet, a head space, an off gas venting outlet and a conduit extending between the head space and the off gas venting outlet;
   (c) a fluid passageway extending between the off gas venting outlet of the water treatment reservoir and an ozone destructor when the water treatment reservoir is mounted on the base;
   (d) a gas water separator positioned in the fluid passageway between the water treatment reservoir and the ozone destructor, the gas water separator positioned such that water accumulated in the gas water separator during a water treatment cycle automatically drains from the apparatus when the water treatment reservoir is removed from the base; and,
   (e) a sealing member movably mounted between a first position in which the water inlet is sealed and a second position in which the water inlet is open and a driving member for moving the sealing member between the first and second positions.

19. The water treatment apparatus as claimed in claim 18 wherein the conduit extends downwardly through the water treatment reservoir to the off gas venting outlet.

20. The water treatment apparatus as claimed in claim 18 wherein the conduit is positioned such that when water is provided in the water treatment reservoir for a treatment cycle, a portion of the conduit extends through water in the water treatment reservoir.

21. The water treatment apparatus as claimed in claim 19 wherein the off gas venting outlet is positioned in the bottom of the water treatment reservoir.

22. A water treatment apparatus comprising:
   (a) a base;
   (b) a water treatment reservoir removable from the base, the water treatment reservoir in fluid communication with an ozone source when mounted on the base, the reservoir having a head space, an off gas venting outlet and a conduit which extends between the head space and the off gas venting outlet, the conduit is positioned such that when water is provided in the water treatment reservoir for a treatment cycle, a portion of the conduit extends through water in the water treatment reservoir;
   (c) a fluid passageway extending between the off gas venting outlet of the water treatment reservoir and an ozone destructor when the water treatment reservoir is mounted on the base; and,
   (d) a gas water separator positioned in the fluid passageway between the water treatment reservoir and the ozone destructor.

23. The water treatment apparatus as claimed in claim 22 wherein the conduit extends downwardly through the water treatment reservoir to the off gas venting outlet.

24. The water treatment apparatus as claimed in claim 23 wherein the off gas venting outlet is positioned in the bottom of the water treatment reservoir.

25. The water treatment apparatus as claimed in claim 24 wherein the gas water separator is positioned such that water accumulated in the gas water separator during a water treatment cycle automatically drains from the apparatus when the water treatment reservoir is removed from the base.

* * * * *

UNITED STATES PATENT AND TRADEMARK OFFICE
CERTIFICATE OF CORRECTION

PATENT NO.   : 6,527,950 B2
DATED        : March 4, 2003
INVENTOR(S)  : Conrad et al.

It is certified that error appears in the above-identified patent and that said Letters Patent is hereby corrected as shown below:

Column 8,
Line 40, delete "In" before "the".

Column 9,
Line 5, delete "8" replace with -- 9 --.

Signed and Sealed this

Twenty-ninth Day of July, 2003

JAMES E. ROGAN
*Director of the United States Patent and Trademark Office*